United States Patent [19]

Satake et al.

[11] Patent Number: 5,378,770
[45] Date of Patent: Jan. 3, 1995

[54] POLY(ARYLENE THIOETHER-KETONE-KETONE) COPOLYMER AND PRODUCTION PROCESS THEREOF

[75] Inventors: Yoshikatsu Satake; Yoshiyuki Inaguma; Jiro Masuko, all of Iwaki, Japan

[73] Assignee: Kureha Kagaku Kogyo K.K., Tokyo, Japan

[21] Appl. No.: 35,768

[22] Filed: Mar. 23, 1993

Related U.S. Application Data

[62] Division of Ser. No. 686,980, Apr. 18, 1991, Pat. No. 5,250,636.

[30] Foreign Application Priority Data

Apr. 25, 1990 [JP] Japan ................................. 109482
Mar. 8, 1991 [JP] Japan ................................. 67550

[51] Int. Cl.$^6$ ............................................. C08G 2/00
[52] U.S. Cl. ................................. 525/471; 525/537; 528/226
[58] Field of Search ............. 525/471, 537; 528/226

[56] References Cited

U.S. PATENT DOCUMENTS

| | | | |
|---|---|---|---|
| 3,919,177 | 11/1975 | Campbell | 260/79.1 |
| 4,772,679 | 9/1988 | Fukawa et al. | 528/220 |
| 4,960,555 | 10/1990 | Satake et al. | 525/471 |

FOREIGN PATENT DOCUMENTS

| | | |
|---|---|---|
| 22938 | 5/1982 | Japan . |
| 5100 | 2/1984 | Japan . |
| 58435 | 4/1985 | Japan . |
| 104126 | 6/1985 | Japan . |
| 120720 | 6/1985 | Japan . |
| 197634 | 9/1986 | Japan . |
| 200127 | 9/1986 | Japan . |
| 27434 | 2/1987 | Japan . |
| 124 | 1/1989 | Japan . |

OTHER PUBLICATIONS

P. C. Dawson, et al. "X-ray Data for Poly(aryl ether ketones)" Polymer Reports, *POLYMER*, 1980, vol. 21 (May 1980) pp. 577–578.

*Primary Examiner*—Melvyn I. Marquis
*Assistant Examiner*—Helen F. Lee
*Attorney, Agent, or Firm*—Lowe, Price, LeBlanc & Becker

[57] ABSTRACT

Disclosed herein is a poly(arylene thioether-ketone-ketone) copolymer comprising (A) at least one poly(arylene thioether-ketone-ketone) segment having predominant recurring units of the formula

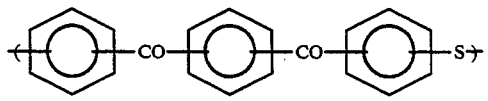

and (B) at least one poly(arylene thioether) segment having predominant recurring units of the formula

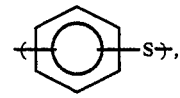

(a) the ratio of the total amount of the poly(arylene thioether) segment (B) to the total amount of the poly(arylene thioether-ketone-ketone) segment (A) ranging from 0.1 to 9 by weight, (b) the weight-average molecular weight of the poly(arylene thioether) segment (B) being at least 200 but lower than 1000, and (c) said copolymer having a melt viscosity of 2–100,000 poises as measured at 380° C. and a shear rate of 1,200/sec as well as a production process of the poly(arylene thioether-ketone-ketone) copolymer. The copolymer has high crystallinity and heat resistance, uniform composition, and excellent melt stability, processability, handling properties, solvent resistance and moisture absorption resistance.

7 Claims, No Drawings

POLY(ARYLENE THIOETHER-KETONE-KETONE) COPOLYMER AND PRODUCTION PROCESS THEREOF

This application is a division of application Ser. No. 07/686,980 filed Apr. 18, 1991, now U.S. Pat. No. 5,250,636.

FIELD OF THE INVENTION

This invention relates to crystalline, heat-resistant poly(arylene thioether-ketone-ketone) copolymers uniform in composition and excellent in melt stability, processability, handling properties, solvent resistance and moisture absorption resistance, and more specifically to novel copolymers containing at least one poly(arylene thioether-ketone-ketone) segment having predominant recurring units of the formula

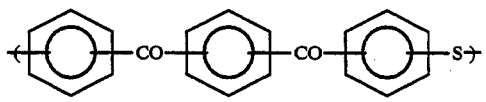

and at least one poly(arylene thioether) segment having predominant recurring units of the formula

and also to a process for the production thereof.

This invention is also concerned with a process for economically producing such copolymers.

BACKGROUND OF THE INVENTION

In the fields of the electronic and electrical industry and the automobile, aircraft and space industries, there is a strong demand in recent years for crystalline thermoplastic resins having high heat resistance of about 300° C. or higher in terms of melting point and moreover easy melt processability. Polyether ketones having predominant recurring units of the following structural formula [I] or [II]:

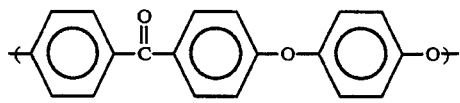

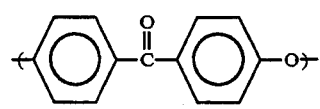

were discussed [Poller, 21, 577 (1980)].

These polyether ketones have excellent heat resistance and mechanical strength. However, they use expensive fluorine-containing monomers and utilize, as a solvent, an aromatic sulfone which is costly upon its separation and purification from the resulting polymers. The production process thereof thus involves many disadvantages in its industrial use (Japanese Patent Publication No. 22938/1982).

Besides, as poly(arylene thioether-ketone) type polymers, there have been proposed polymers having predominant recurring units of the following structural formula [III], [IV], ]IV] or [VII]:

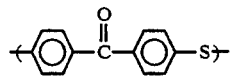

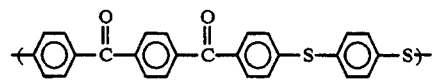

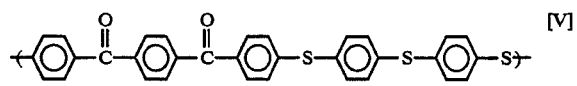

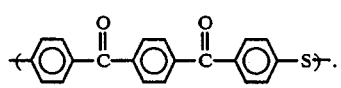

The poly(arylene thioether-ketone)s (hereinafter abbreviated as "PTKs") having the predominant recurring units of the structural formula [III] have excellent heat resistance, but involve a problem that they have poor stability upon melting (Japanese Patent Laid-Open Nos. 8435/1985 and 124/1989).

The polymers having the predominant recurring units of the structural formulae [IV] and [V], respectively, are not suitable for industrial production because they must use particular polymerization solvents and monomers (Japanese Patent Laid-Open Nos. 20017/1986, 197634/1986 and 27434/1987).

The poly(arylene thioether-ketone-ketone)s (hereinafter abbreviated as "PTKKs") having the predominant recurring units of the structural formula [VI] have a melting point as extremely high as about 410° C. This is however not all good. Their melt processing temperature are high accordingly, so that they tend to loss their crystallinity or to undergo crosslinking and/or carbonization, resulting in a rapid increase in melt viscosity, upon their melt processing.

In addition, since PTKKs contain ketone groups in their recurring units, they are poor in solvent resistance and moisture absorption resistance, so that their application fields as heat-resistant resins are unavoidably limited. PTKKs are generally obtained as fine powders. This has led to an additional problem upon their production such that they show poor handling properties in their collection step after polymerization, especially in filtration, washing, drying and transportation. Still further problems have also arisen such as poor metering property upon melt processing and occurrence of blocking in hoppers or the like.

On the other hand, for example, poly(p-phenylene thioether) as a poly(arylene thioether) (hereinafter abbreviated as "PATE") is used as high-performance engineering plastics having excellent heat resistance and solvent resistance. This polymer is obtained by reacting dichlorobenzene, which is very cheap and industrially available, with sodium sulfide (U.S. Pat. No. 3,919,177). However, its crystalline melting point is about 285° C. and its glass transition point (Tg) is also as low as about 85° C. There is thus a demand for development of polymers having a higher melting point and a higher Tg.

In order to solve the above problem, there has also been proposed copolymers in which arylene thioether units and sulfone units of the formula

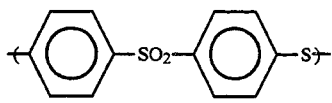

or ketone units of the formula

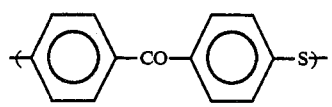

are introduced at random therein (Japanese Patent Publication No. 5100/1984).

It is however impossible to obtain polymers having satisfactory uniformity in composition, heat resistance and/or melt stability by the prior art process in which a dihalobenzene and a dihalogenated aromatic compound activated by the ketone group or sulfone group are reacted together with an alkali metal sulfide in a polar organic solvent to copolymerize them, because their reactivity and chemical stability in a polymerization system are different from each other. Namely, the resultant random copolymers tend to have lower crystallinity and poorer heat resistance and mechanical properties as the proportion of the arylene thioether units decreases, in particular, to 90 mole % or less.

It has been proposed to react an aromatic thioether with phosgene or an aromatic dicarboxylic acid dihalide in the presence of a Lewis acid in an aprotic solvent, thereby obtaining polymers having respective predominant recurring units of the following structural formulae [VII] and [VIII] (Japanese Patent Laid-Open Nos. 104126/1985 and 120720/1985):

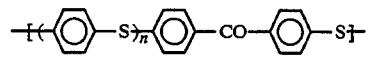 [VII]

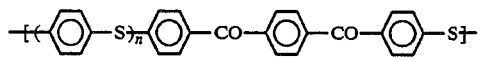 [VIII]

However, the resulting polymers were accompanied by problems that they have a low degree of polymerization and poor melt stability, and undergo gelation at once.

OBJECTS AND SUMMARY OF THE INVENTION

An object of this invention is to provide copolymers with improved processability, handling properties, solvent resistance and moisture absorption resistance while retaining the excellent properties, such as heat resistance and crystallinity, of PTKKs as much as possible.

Another object of this invention is to provide a process for economically producing such copolymers.

With a view toward improving the processability of a PTKK, the present inventors first of all attempted to lower the melting point, i.e., processing temperature of the PTKK by random copolymerization of its monomer with monomers of a kind different from the first-mentioned monomer. Namely, bis(4-chlorobenzoyl)benzene was combined with dihalobenzenes, respectively, followed by random copolymerization. However, the resultant random copolymers tended to have lower crystallinity and heat resistance and poorer melt stability as the proportions of the dihalobenzenes increased.

Further, bis(halobenzoyl)benzenes have been activated by the ketone group and have far higher reactivity compared with dihalobenzenes. They hence have extremely poor copolymerizability with dihalobenzenes.

The present inventors then attempted to produce a PTKK-PATE copolymer in which a PATE having recurring units of the formula

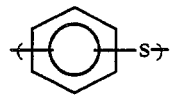

is incorporated as segments in chain of a PTKK. As a result, it has been found that a copolymer having excellent processability and high crystallinity can be obtained by using as an oligomer a PATE, which has a particular average polymerization degree and contains at least one terminal thiolate group as a reactive terminal group, and reacting the PATE oligomer with a bis(halobenzoyl)benzene under specific conditions in an organic amide solvent.

It has also been found that a copolymer similar to the above-described copolymer can be obtained by reacting the PATE oligomer with a PTKK oligomer under specific conditions.

It has also been revealed that each of these copolymers can be obtained as granules having good handling properties from its polymerization system by a conventional collection method.

The present invention has been brought to completion on the basis of these findings.

According to the present invention, there are thus provided the following copolymer having high heat resistance and crystallinity and production processes thereof.

Namely, in an aspect of this invention, there is provided a poly(arylene thioether-ketone-ketone) copolymer comprising (A) at least one poly(arylene thioether-ketone-ketone) segment having predominant recurring units of the formula

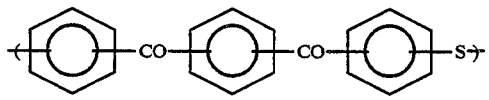

and (B) at least one poly(arylene thioether) segment having predominant recurring units of the formula

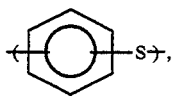, (a) the ratio of the total amount of the poly(arylene thioether) segment (B) to the total amount of the poly(arylene thioether-ketone-ketone) segment (A) ranging from 0.1 to 9 by weight, (b) the weight-average molecular weight of the poly(arylene thioether) segment (B) being at least 200 but lower than 1000, and (c) said copolymer having a melt viscosity of 2–100,000 poises as measured at 380° C. and a shear rate of 1,200/sec.

In another aspect of this invention, there is also provided a process for the production of a poly(arylene thioether-ketone-ketone) copolymer comprising (A) at least one poly(arylene thioether-ketone-ketone) segment and (B) at least one poly(arylene thioether) segment, which comprises at least the following two steps:

i) heating in the presence of water an organic amide solvent containing a dihalogenated aromatic compound, which consists principally of a dihalobenzene, and an alkali metal sulfide, whereby a poly(arylene thioether) oligomer having predominant recurring units of the formula

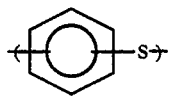

and at least one terminal thiolate group is synthesized, and ii) mixing the oligomer, which has been obtained in the step i), with a dihalogenated aromatic compound consisting principally of at least one bis(-halobenzoyl)-benzene, and optionally, an alkali metal sulfide, an organic amide solvent and/or water, and heating the resultant mixture to form a poly(arylene thioether-ketone-ketone) segment having predominant recurring units of the formula

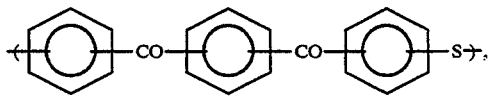

thereby forming the copolymer;

said first and second steps i) and ii) being conducted under the following conditions (a)-(f):

(a) in the first step i), the ratio of the water content to the amount of the charged organic amide solvent being 0.1-15 (mol/kg), the ratio of the amount of the charged dihalogenated aromatic compound to the amount of the charged alkali metal sulfide being 0.3-0.9 (mol/mol), and the polymerization being conducted in such a manner that the resulting poly(arylene thioether) oligomer has at least one terminal thiolate group and its weight-average molecular weight becomes at least 200 but lower than 1000, (b) in the second step ii), the ratio of the water content to the amount of the charged organic amide solvent being controlled within a range of 0.1-15 (mol/kg), (c) in the second step ii), the ratio of the total amount of the charged dihalogenated aromatic compound, said total amount being the amount of the whole dihalogenated aromatic compounds including the dihalobenzene and the bis(halobenzoyl)benzene, to the total amount of the charged alkali metal sulfide, said latter total amount being the total amount of the alkali metal sulfide charged in the first step i) and that optionally charged in the second step ii), being controlled within a range of 0.95-1.2 (mol/mol), (d) the ratio of the charged amount of the dihalogenated aromatic compound consisting principally of the dihalobenzene in the step i) to the charged amount of the dihalogenated aromatic compound consisting principally of the bis(-halobenzoyl)benzene in the step ii) being controlled within a range of 0.25-26 (mol/mol), (e) the reaction of the second step ii) being conducted within a temperature range of 150°-300° C. with the proviso that the reaction time at 210° C. and higher is not longer than 10 hours, and (f) in the second step ii), the reaction being conducted until the melt viscosity of the resulting copolymer becomes 2-100,000 poises as measured at 380° C. and a shear rate of 1,200/sec.

In a further aspect of this invention, there is also provided a process for the production of a poly(arylene thioether-ketone-ketone) copolymer comprising (A) at least one poly(arylene thioether-ketone-ketone) segment and (B) at least one poly(arylene thioether) segment, which comprises at least the following three steps:

i) heating in the presence of water an organic amide solvent containing a dihalogenated aromatic compound, which consists principally of a dihalobenzene, and an alkali metal sulfide, whereby a poly(arylene thioether) oligomer having predominant recurring units of the formula

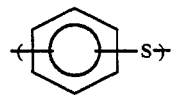

and at least one terminal thiolate group is synthesized, ii) heating in the presence of water an organic amide solvent containing a dihalogenated aromatic compound, which consists principally of at least one bis(halo-benzoyl)benzene, and an alkali metal sulfide, whereby a poly(arylene thioether-ketone-ketone) oligomer having predominant recurring units of the formula

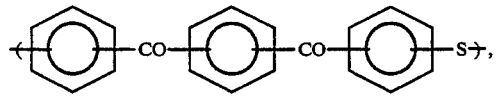

and terminal halogen atoms is synthesized, and iii) mixing and reacting the poly(arylene thioether) oligomer, which has been obtained in the step i), with poly(arylene thioether-ketone-ketone) oligomer obtained in the step ii) and optionally, water;

said first through third steps i)-iii) being conducted under the following conditions (a)-(g):

(a) in the first step i), the ratio of the water content to the amount of the charged organic amide solvent being 0.1-15 (mol/kg), the ratio of the amount of the charged dihalogenated aromatic compound to the amount of the charged alkali metal sulfide being 0.3-0.9 (mol/mol), and the polymerization being conducted in such a manner that the weight-average molecular weight of the resulting poly(arylene thioether) oligomer having at least one terminal thiolate group becomes at least 200 but lower than 1000, (b) in the second step ii), the ratio of the water content to the amount of the charged organic amide solvent being controlled within a range of 0.1-15 (mol/kg) and the reaction being conducted within a temperature range of 60°–300° C. with the proviso that the reaction time at 210° C. and higher is not longer than 10 hours, (c) in the third step iii), the ratio of the water content to the amount of the charged organic amide solvent being 0.1–15 (mol/kg), (d) in the third step iii), the ratio of the total amount of the charged dihalogenated aromatic compound, said total amount being the amount of the whole dihalogenated aromatic compounds including the dihalobenzene and the bis(halobenzoyl)benzene, to the total amount of the charged alkali metal sulfide, said latter total amount being the total amount of the alkali metal sulfide charged in the first step i) and that charged in the second step ii), being controlled within a range of 0.95–1.2 (mol/mol), (e) the ratio of the charged amount of the dihalogenated aromatic compound consisting principally of the dihalobenzene in the step i) to the charged amount of the dihalogenated aromatic compound consisting principally of the bis(-halobenzoyl)benzene in the step ii) being controlled within a range of 0.25–26 (mol/mol), (f) the reaction of the third step iii) being conducted within a temperature range of 150°–300° C. with the proviso that the reaction time at 210° C. and higher is not longer than 10 hours, and (g) in the third step iii), the reaction being conducted until the melt viscosity of the resulting copolymer becomes 2–100,000 poises as measured at 380° C. and a shear rate of 1,200/sec.

DETAILED DESCRIPTION OF THE INVENTION

Features of the present invention will hereinafter be described in detail.

POLY(ARYLENE THIOETHER-KETONE-KETONE) COPOLYMER

Chemical Structure of Copolymer

The copolymers according to the present invention are copolymers comprising (A) at least one PTKK segment having predominant recurring units of the formula

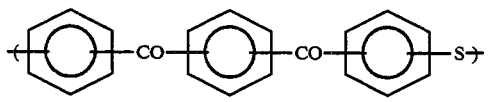

and (B) at least one PATE segment having predominant recurring units of the formula

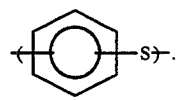

The PTKK segment (A) and the PATE segment (B) contain respectively the above-described recurring units in proportions of at least 50 wt. %, preferably at least 70 wt. %, particularly preferably at least 80 wt. %.

Among these recurring units, the recurring units of the formulae

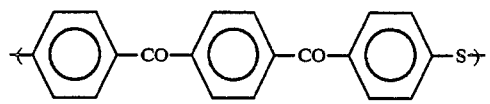

and

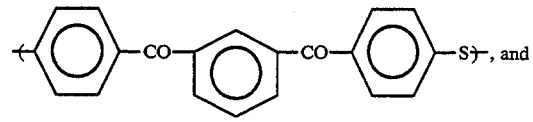

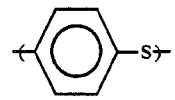

are preferred as the recurring unit segments (A) and (B), respectively, because they can afford copolymers excellent especially from the viewpoint of crystallinity, melt stability, heat resistance, mechanical properties, solvent resistance, moisture absorption resistance and the like.

The copolymer of the present invention can have a desired structure containing both segments, such as $(A)[(B)-(A)]_m(B)-(A)$, m being 0 or an integer of 1 or greater or $(A)[(B)-(A)]_n(B)$, n being 0 or an integer of 1 or greater.

It is however required that the weight ratio of the total amount of segments (B) to the total amount of segments (A) be within a range of 0.1–9, preferably 0.3–5, more preferably 0.35–4.

The segment (A) serves to impart high degree of heat resistance and crystallinity to the copolymer. On the other hand, the segment (B) contributes to the reduction of the processing temperature, the improvement of the solvent resistance and moisture absorption resistance and the granulation while maintaining the high crystallinity. Therefore, copolymers in which the weight ratio of the total amount of segments (B) to the total amount of segments (A) is at least 0.1 but lower than 1, preferably at least 0.3 but lower than 1 feature particularly good heat resistance and high crystallinity. Ratios in a range of 1–9, preferably 1–5 give copolymers excellent especially in processability while retaining excellent crystallinity. In addition, the resulting copolymers are easy to collect as granules having a suitable particle size, and moreover become excellent in solvent resistance and moisture absorption resistance.

However, any weight ratios of the total amount of segments (B) to the total amount of segments (A) lower than 0.1 are too low to achieve any sufficient reduction in processing temperature, improvement in solvent resistance and moisture absorption resistance or formation into granules. To the contrary, any ratios higher than 9 lead to a substantial reduction in heat resistance and disturb the balancing between heat resistance and processability. Ratios outside the above range are therefore not preferred.

It is essential for the segment (B) to have a weight-average molecular weight not lower than 200 but lower than 1000, preferably, of at least 300 but at most 950.

As the length of the segment (B) in the copolymer according to the present invention is shorter, the melting point becomes sharper, and the uniformity in composition becomes higher, so that preferred processability and physical properties can easily be achieved.

If the weight-average molecular weight of the segment (B) is not lower than 1000, the resulting copolymer becomes similar to a block copolymer, so that it has physical properties characteristic of both PTKK and PATE, for example, melting points corresponding to those thereof and requires a temperature higher than that of the copolymer according to the present invention upon its melt processing. Such a high molecular weight is therefore not preferred. Any segments (B) lengthened further are not preferred because the composition distribution of the resulting copolymer becomes wider correspondingly. Besides, any segments (B) having a weight-average molecular weight of at most 200 can hardly be produced.

Incidentally, the weight-average molecular weight of the PATE segment (B) in this invention is determined by gel permeation chromatography (GPC) at a stage of the PATE oligomer.

Measuring conditions are as follows:
Column: SHODEX AT80M/S, two columns in series
Solvent: α-chloronaphthalene
Flow rate: 0.7 ml/min
Temperature: 220° C.
Sample concentration: 0.05 wt. %
Charged amount: 200 μl
Detector: flame ionization detector (FID)
Calibration of molecular weight: standard poly(styrene) and

Data processing: SIC. 7000B (manufactured by System Instrument Co.)

The segment (A) and segment (B) can contain one or more recurring units other than their predominant recurring units of the formulae

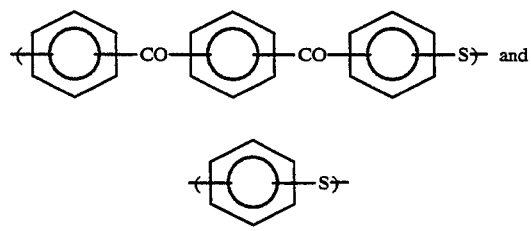

to an extent that the objects of the present invention are not impaired. In general, these other recurring units can be introduced into the copolymers by using the corresponding various dihalogenated aromatic compounds as comonomers.

Physical Properties of the Copolymers

Physical properties and other characteristics of the copolymers according to this invention will next described in detail from the viewpoint of melting point (processability), melt stability, crystallinity and the like.
(1) Melting point (processability):

The melting point of PTKK homopolymer is about 410° C. The extent of a reduction in the melting point due to copolymerization with another monomer of a different kind, $\Delta Tm = [410° C. - Tm$ (melting point of copolymer)$]$ is generally proportional to the extent of a reduction in the melt processing temperature. Accordingly, $\Delta Tm$ can be used as an index indicative of processing temperature reducing effect, namely, processability improving effect.

$\Delta Tm$ may preferably be 20°–130° C., more preferably 40°–120° C., most preferably 50°–115° C. If $\Delta Tm$ is lower than 20° C., there is a potential problem that the processability improving effect may not be sufficient. If $\Delta Tm$ is higher than 130° C. on the other hand, there is another potential problem that the copolymer may lose the characteristics as a heat-resistant resin. $\Delta Tm$ outside the above range is therefore not preferred.
(2) Crystallinity:

One of great features of the copolymers according to this invention resides in that they have not only excellent processability but also high crystallinity. Crystallinity imparts high heat resistance to a copolymer. To have a copolymer equipped with high heat resistance, it is essential that the copolymer has sufficient crystallinity.

In general, melt crystallization enthalpy, $\Delta Hmc$ is proportional to the degree of crystallization when a molten polymer undergoes crystallization. On the other hand, melt crystallization temperature, $Tmc$ serves as an index of the readiness of crystallization. Therefore, the melt crystallization enthalpy, $\Delta Hmc$ (400° C.) and melt crystallization temperature, $Tmc$ (400° C.) of a copolymer according to this invention as measured when cooled at a rate of 10° C./min immediately after being heated to 400° C. in an inert gas atmosphere by means of a differential scanning calorimeter (hereinafter abbreviated as "DSC") can be used as indices of the crystallinity of the copolymer.

In addition, residual melt crystallization enthalpy, $\Delta Hmc$ (400° C./10 min) and melt crystallization temperature, $Tmc$ (400° C./10 min) measurable upon determination of the residual crystallinity, both of which will be described subsequently, can be used as an index of not only melt stability but also crystallinity.

The copolymers according to this invention may preferably have $\Delta Hmc$ (400° C.) of at least 15 J/g, more preferably at least 20 J/g, most preferably at least 25 J/g. On the other hand, $Tmc$ (400° C.) may desirably be at least 180° C., with at least 190° C. being more preferred. Copolymers having $\Delta Hmc$ (400° C.) smaller than 15 J/g or $Tmc$ (400° C.) lower than 180° C. may have insufficient heat resistance as heat-resistant polymers and are hence not preferred.
(3) Melt stability:

The greatest feature of the copolymers according to this invention resides in that they have melt stability sufficient to permit the application of conventional melt processing techniques.

Polymers of poor melt stability tend to lose their crystallinity or to undergo crosslinking or carbonization, resulting in a rapid increase in melt viscosity, upon melt processing.

It is hence possible to obtain an index of the melt processability of a polymer by investigating the residual crystallinity of the polymer after holding it at an elevated temperature of its melt processing temperature or higher for a predetermined period of time. The residual crystallinity can be evaluated quantitatively by measuring the melt crystallization enthalpy of the polymer by a DSC.

Specifically, it is possible to use as indices of the melt stability of a copolymer its residual melt crystallization enthalpy, $\Delta Hmc$ (400° C./10 min) and melt crystallization temperature, $Tmc$ (400° C./10 min), which are determined at a cooling rate of 10° C./min after the copolymer is held at 50° C. for 5 minutes in an inert gas atmosphere, heated to 400° C. at a rate of 75° C./min and then held for 10 minutes at 400° C. which is higher than the melt processing temperature of the copolymer.

In the case of a copolymer having poor melt stability, it undergoes crosslinking or the like under the above conditions, namely, when it is held for 10 minutes at the high temperature of 400° C., whereby the copolymer loses its crystallinity substantially.

The copolymers of this invention are polymers having the physical properties that their residual melt crystallization enthalpies, $\Delta$Hmc (400° C./10 min) are at least 10 J/g, more preferably at least 15 J/g, most preferably at least 20 J/g and their melt crystallization temperatures, Tmc (400° C./10 min) are at least 170° C., more preferably at least 180° C., most preferably at least 190° C.

A polymer, whose $\Delta$Hmc (400° C./10 min) is smaller than 10 J/g or whose Tmc (400° C./10 min) is lower than 170° C., tends to lose its crystallinity or to induce a melt viscosity increase upon melt processing, so that difficulties are encountered upon application of conventional melt processing techniques.

Further, the ratio of melt crystallization enthalpy to residual melt crystallization enthalpy, namely, $\Delta$Hmc (400° C.)/$\Delta$Hmc (400° C./10 min) can also be used as an index of melt stability. Deterioration by heat becomes smaller as this ratio decreases. Therefore, it is preferably that $\Delta$Hmc (400° C./10 min) is at least 10 J/g and the above ratio is 5 or smaller, more preferably 3 or smaller.

(4) Melt viscosity:

In this invention, the melt viscosity, $\eta^*$ of each copolymer is used as an index of its molecular weight.

Specifically, a polymer sample is filled in a Capirograph manufactured by Toyo Seiki Seisaku-Sho, Ltd. and equipped with a nozzle having an inner diameter of 1 mm$\phi$ and an L/D ratio of 10/1 and is preheated at 380° C. for 5 minutes. Its melt viscosity, $\eta^*$ is measured at a shear rate of 1,200/sec.

The copolymers of the present invention have a melt viscosity, $\eta^*$ of 2–100,000 poises, preferably 5–50,000 poises, more preferably 10–30,000 poises.

Those having a melt viscosity, $\eta^*$ lower than 2 poises have an unduly low molecular weight, so that their flowability is too high to conduct conventional melt processing. Even if melt-formed or melt-molded products are obtained, their physical properties are considerably inferior. Such low melt viscosities are therefore not preferred. On the other hand, those having a melt viscosity, $\eta^*$ higher than 100,000 poises have an unduly high molecular weight, so that their flowability is too low to conduct conventional melt processing. Such high melt viscosities are therefore not preferred either.

(5) Solvent resistance and moisture absorption resistance:

One of the features of the copolymer according to this invention resides in that PTKK homopolymer has poor solvent resistance and moisture absorption resistance as one of its disadvantages, whereas the copolymers of this invention have improved solvent resistance and moisture absorption resistance.

PTKK homopolymer is easily dissolved in concentrated sulfuric acid at room temperature and also has high moisture absorption. In general, the copolymers of this invention are insoluble in concentrated sulfuric acid or require a lot of time for their dissolution in spite of some variations depending upon their compositional ratios as the weight ratio of the total amount of the PATE segment (B) increases, and moreover, their moisture absorption also becomes lower.

To have a copolymer equipped with preferred solvent resistance and moisture absorption resistance, it is desirable that the weight ratio of the total amount of PATE segments (B) to the total amount of PTKK segments (A) be preferably at least 0.5, particularly preferably at least 1.

PRODUCTION PROCESS OF COPOLYMERS

A variety of processes may be contemplated for the production of the copolymers, for example, including:

(1) A dihalogenated aromatic compound consisting principally of a bis(halobenzoyl)benzene is added to and reacted with a PATE oligomer which has been prepared in advance, whereby a PTKK segment (A) is formed to form a copolymer.

(2) A dihalogenated aromatic compound consisting principally of a dihalobenzene is added to and reacted with a PTKK oligomer which has been prepared in advance, whereby a PATE segment (B) is formed to form a copolymer.

(3) A PTKK oligomer and a PATE oligomer, which have been prepared separately, are chemically combined together.

The present inventors carefully studied those processes. As a result, it has been found that the processes (1) and (3) are more suitable for obtaining the copolymers of this invention.

A. Raw Materials for Copolymers

In the process for the production of a copolymer of this invention, an alkali metal sulfide and a dihalogenated aromatic compound are employed as principal raw materials for the polymer and an organic amide solvent and water, including water of hydration, as reaction media.

(1) Alkali metal sulfide:

Illustrative examples of the alkali metal sulfide useful in the practice of this invention include lithium sulfide, sodium sulfide, potassium sulfide, rubidium sulfide, cesium sulfide and mixtures thereof.

An alkali metal sulfide prepared from an alkali metal hydrogensulfide and an alkali metal hydroxide may also be used.

(2) Dihalogenated aromatic compound:

The dihalogenated aromatic compound employed in the present invention for the formation of the PTKK segment (A), including a PTKK oligomer, consists principally of a bis(halobenzoyl)benzene. There is preferably used 1,4-bis(4-chlorobenzoyl)benzene, 1,4-bis(4-bromobenzoyl) benzene, 1,3-bis(4-chlorobenzoyl)benzene, 1,3-bis(4 -bromobenzoyl)benzene or a mixture of these two or more compounds.

The dihalogenated aromatic compound used in the present invention for the formation of the PATE segment (B), including a PATE oligomer, consists principally of a dihalobenzene such as p-dihalobenzene or m-dihalobenzene. p-dichlorobenzene and/or m-dichlorobenzene is preferably used.

As other copolymerizable dihalogenated aromatic compounds, may be mentioned, for example, dihalobenzo-phenones, bis(halobenzoylphenyl) ethers, bis(-halobenzoylphenyl) thioethers, dihaloalkylbenzenes, dihalobiphenyls, dihalodiphenyl sulfones, dihalonaphthalenes, bis(halogenated phenyl)methanes, dihalopyridines, dihalothiophenes and dihalobenzonitriles, and mixtures thereof.

As substituent halogen atoms, chlorine or bromine atoms may be used preferably from the economical viewpoint. Within a range not giving too much effect to cost, a small amount of a fluorine compound may also be used in combination.

It is also permissible to produce a copolymer, which has a partially crosslinked and/or branched structure, by causing a trihalogenated or higher polyhalogenated compound to exist in a reaction system in such a small amount that the processability and physical properties of the copolymer may not be impaired to any substantial extent.

(3) Organic amide solvent:

As reaction media useful for the production process of the copolymers according to this invention, aprotic polar organic solvents having excellent heat stability and alkali resistance can be used. Of these, organic amide solvents, including carbamic amides, and sulfone solvents are particularly preferred.

As such organic amide solvents or sulfone solvents, may be mentioned N-methylpyrrolidone, N-ethylpyrrolidone, N,N'-ethylenedipyrrolidone, pyrrolidones, hexamethylphosphoric triamide, tetramethylurea, dimethylimidazolidinone, dimethylacetamide, ε-caprolactam, N-ethylcaprolactam, sulfolane, diphenyl sulfone, etc. They may also be used as a mixed solvent.

Among these organic amide solvents, N-methyl-pyrrolidone or N-ethylpyrrolidone and a mixed solvent thereof are particularly preferred from the viewpoint of the readiness in obtaining a melt-stable copolymer, thermal and chemical stability, economy, etc.

B. Polymerization Process and Reaction Conditions

For the preparation of the PATE oligomer, for the reaction in which the PTKK segment is formed in the presence of the PATE oligomer to form a copolymer, for the preparation of the PTKK oligomer and for the reaction in which the PTKK oligomer and PATE oligomer are combined together to synthesize a copolymer, it is necessary to conduct the reaction under special conditions, namely by causing water to exist in specific amounts in the reaction systems, controlling the monomer compositions suitably, regulating the polymerization temperatures appropriately, and limiting reaction time at high temperatures to specific short periods of time. In addition, it is effective for the production of copolymers having more preferable physical properties, for example, to choose a suitable material for the reactor and to apply stabilization treatment in a final stage of the reaction.

Unless these reaction conditions are suitably controlled, it is difficult to provide crystalline copolymers having melt stability suitable for conventional melt processing.

PREPARATION PROCESS OF OLIGOMERS (1) PATE Oligomer

The PATE oligomer employed as a raw material for the copolymer of this invention and having a specific weight-average molecular weight and at least one terminal thiolate group can be prepared by having an alkali metal sulfide and a dihalogenated aromatic compound, which consists principally of a dihalobenzene, undergo a reaction in the presence of water in an organic amide solvent under the following conditions (a)-(c):

(a) The ratio of the water content to the amount of the charged organic amide solvent is within a range of 0.1-15 (mol/kg), preferably 0.3-12 (mol/kg), more preferably 0.5-11 (mol/kg).

(b) The ratio of the amount of the charged dihalogenated aromatic compound to the amount of the charged alkali metal sulfide is within a range of 0.3-0.9 (mol/mol), preferably 0.4-0.86 (mol/mol), more preferably at least 0.5 but less than 0.7 (mol/mol).

(c) The reaction is conducted at a temperature within a range of 150°-290° C., preferably 200°-280° C., and controlled in such a manner that the weight-average molecular weight of the resulting oligomer becomes at least 200 but lower than 1000, preferably at least 300 but at most 950.

In this reaction, the amount of the charged alkali metal sulfide is more than that of the charged dihalogenated aromatic compound. Therefore, the PATE oligomer formed has at least one terminal thiolate group. The oligomer having at least one terminal thiolate group means an oligomer having a thiolate group on its each terminal or one terminal, or a mixture thereof.

The PATE oligomer may contain some crosslinked structure and/or branched structure introduced typically by allowing a trihalobenzene or higher polyhalobenzene to present in a small amount in the polymerization reaction Incidentally, among the recurring units of the formula

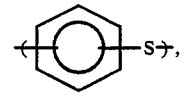

the recurring unit of the formula

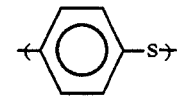

is preferred (2) PTKK Oligomer

The PTKK oligomer employed as a raw material for the copolymer of this invention can be prepared in the following manner.

Namely, the PTKK oligomer can be prepared by having an alkali metal sulfide and a dihalogenated aromatic compound, which consists principally of a bis(-halo-benzoyl)benzene, undergo a reaction in the presence of water in an organic amide solvent under the following conditions (a)-(b):

(a) The ratio of the water content to the amount of the charged organic amide solvent is within a range of 0.1-15 (mol/kg), preferably 1-12 (mol/kg), more preferably 2.5-10 (mol/kg). Water contents lower than 0.1 mole can hardly provide a PTKK oligomer having high melt stability and moreover tend to induce decomposition in the polymerization reaction. On the other hand, water contents higher than 15 moles result in a reduction in the reaction rates. Such high water contents are hence not preferred economically.

(b) The reaction is conducted at a temperature within a range of 60°–300° C. with the proviso that the reaction time at 210° C. and higher is not longer than 10 hours. The temperature may preferably be within a range of 150°–290° C., more preferably 170°–260° C.

The PTKK oligomer may contain some crosslinked structure and/or branched structure introduced typically by allowing a trihalobenzophenone or higher polyhalobenzophenone to present in a small amount in the polymerization reaction system.

The PTKK oligomer has a reduced viscosity of 0.2 dl/g or lower, preferably 0.1 dl/g or lower, more preferably 0.05 dl/g as determined by viscosity measurement at 30° C. and a polymer concentration of 1.0 g/dl in 98% concentrated sulfuric acid.

The ratio of the amount of the charged dihalogenated aromatic compound to the amount of the charged alkali metal sulfide upon synthesis of the PTKK oligomer may preferably be at least 1.15 (mol/mol), more preferably at least 1.2 (mol/mol), most preferably at least 1.3 (mol/mol).

Besides, with respect to the ratio of the amount of the charged organic amide solvent to the amount of the charged alkali metal sulfide in the composition of charges upon synthesis of the PTKK oligomer, it is desirable to charge the organic amide solvent, in general, in an amount of 0.6–100 kg, more preferably 1.0–50 kg per mole of the amount of the charged alkali metal sulfide.

PRODUCTION PROCESS OF COPOLYMERS

As the first production process for each copolymer according to this invention, may be described the process (Production Process No. 1) in which a PATE oligomer is prepared in advance and at least one PTKK segment is formed in the presence of the PATE oligomer. This process is substantially a two-step process.

As the second production process for each copolymer according to this invention, may be described the process (Production Process No. 2) in which PATE and PTKK oligomers are prepared in advance and are then reacted to combine them together. This process is substantially a three-step process.

The reaction conditions employed in the synthesis stage of the copolymer will hereinafter be described in further detail.

(1) Water Content

In the process for the preparation of the copolymer of this invention, the water content in the reaction system may desirably be within a range of 0.1–15 moles, preferably 2.5–15 moles, more preferably 3.5–14 moles per kg of the amount of the charged organic amide solvent. Water contents lower than 0.1 mole can hardly provide a copolymer having high melt stability and moreover tend to induce decomposition in the polymerization reaction. On the other hand, water contents higher than 15 moles result in a reduction in the reaction rates, so that the reaction requires an unduly long period of time. Such high water contents are hence not preferred in industry. In order to adjust the water content in a reaction system, the water content may be reduced by distillation or the like or may be increased by adding water prior to the initiation of a polymerization reaction.

(2) Composition of Monomers Charged

The ratio of the total amount of the dihalogenated aromatic compound to the total amount of the alkali metal sulfide, both charged upon synthesis of the copolymer, may desirably be within a range of 0.95–1.2 (mol/mol), more preferably 0.97–1.10 (mol/mol), most preferably 0.98–1.05 (mol/mol).

Here, the term "the total amount of the charged alkali metal sulfide" means the sum of the amount of the alkali metal sulfide charged upon synthesis of the PTKK oligomer and/or the PATE oligomer and the amount of the alkali metal sulfide charged upon synthesis of the copolymer.

When a copolymer is synthesized using a portion or portions of synthesized PTKK oligomer and/or PATE oligomer, the amounts of the alkali metal sulfide and dihalogenated aromatic compound charged upon synthesis of each oligomer must be taken into consideration.

Ratios smaller than 0.95 can hardly provide a copolymer having excellent melt stability and tend to induce decomposition during the reaction. On the other hand, ratios greater than 1.2 can only provide a copolymer having a low molecular weight. Therefore, such small or large ratios are not preferred.

Besides, with respect to the ratio of the amount of the charged organic amide solvent to the amount of the charged alkali metal sulfide in the compositions of charges upon synthesis of the PATE oligomer and copolymer, it is desirable to charge the organic amide solvent, in general, in an amount of 0.3–5 kg, more preferably 0.4–3 kg per mole of the amount of the charged alkali metal sulfide, depending upon the composition of the charged dihalogenated aromatic compound.

Where the alkali metal sulfide is lost by a distilling operation or the like prior to the initiation of the reaction, the term "the amount of the charged alkali metal sulfide" as used herein means the remaining amount which is obtained by subtracting the loss from the amount actually charged.

The ratio of the charged amount of the dihalogenated aromatic compound consisting principally of the dihalobenzene in the first step to the charged amount of the dihalogenated aromatic compound consisting principally of the bis(halobenzoyl)benzene in the second step must be controlled within a range of 0.25–26 (mol/mol), preferably 0.9–14 (mol/mol), more preferably 1–12 (mol/mol). The bis(halobenzoyl)benzene serves to impart high degree of heat resistance and crystallinity to the copolymer. On the other hand, the dihalobenzene contributes to the reduction of the processing temperature, the improvement of the solvent resistance and moisture absorption resistance and the granulation while maintaining the high crystallinity.

Accordingly, copolymers in which the molar ratio of the charged amount of the dihalogenated aromatic compound consisting principally of the dihalobenzene in the first step to the charged amount of the dihalogenated aromatic compound consisting principally of the bis(halobenzoyl)benzene in the second step is within a range of 0.25–2.9, preferably 0.9–2.9 feature particularly good heat resistance and high crystallinity. On the other hand, ratios in a range of 3–26, preferably 3–14 give copolymers excellent especially in processability while retaining excellent crystallinity. In addition, the resulting copolymers are easy to collect as granules having a suitable particle size, and moreover become excellent in solvent resistance and moisture absorption resistance.

However, any ratios lower than 0.25 are too low to achieve any sufficient reduction in processing temperature, improvement in solvent resistance and moisture absorption resistance or formation into granules. To the contrary, any ratios higher than 26 lead to a substantial reduction in heat resistance and disturb the balancing between heat resistance and processability. Ratios outside the above range are therefore not preferred.

The term "the amount of the charged dihalogenated aromatic compound" as used herein should be interpreted not to include the amount of the halogen-substituted aromatic compound added in the final stage of the reaction for effecting a stabilizing treatment to be described subsequently.

(3) Reaction Temperature and Reaction Time

In the process of this invention for the production of the copolymer, the reaction is conducted at a temperature in a range of 150°–300° C., preferably 200°–290° C., more preferably 210°–280° C.

Reaction temperatures lower than 150° C. require an unduly long time to obtain the copolymer and are therefore economically disadvantageous. On the other hand, reaction temperatures higher than 300° C. can hardly obtain the copolymer in a form excellent in melt stability and moreover involve a potential problem of decomposition during the reaction.

The polymerization time required for obtaining a PTKK oligomer or copolymer of a desired molecular weight becomes shorter as the polymerization temperature increases but becomes longer as the polymerization temperature decreases. Accordingly, it is generally advantageous to conduct the polymerization at a temperature of 210° C. or higher from the viewpoint of productivity. It is however not preferred to conduct the reaction at a temperature of 210° C. or higher for 10 hours or longer, because a PTKK oligomer or copolymer having excellent melt stability can hardly be obtained under such conditions.

(4) Reactor

In the process of this invention for the production of each of the PTKK oligomer, PATE oligomer and copolymer, it is preferable to use, as a reactor (including equipment employed for provisional procedures of the polymerization reaction, for example, those required for dehydration and the like), a reactor which is made of a corrosion-resistant material at [east at portions with which the reaction mixture is brought into direct contact. The corrosion-resistant material is supposed to be inert so that it does not react with the reaction mixture.

Preferable examples of such a corrosion-resistant material include titanium materials such as titanium and titanium-containing alloys and nickel-containing corrosion-resistant materials.

Of these, it is particularly preferred to use a reactor lined with a titanium material.

The use of a reactor made of a corrosion-resistant material such as that described above makes it possible to obtain a copolymer having high heat resistance and molecular weight.

(5) Treatment in the Final Stage of the Reaction

Although a copolymer having excellent melt stability can be obtained by the above-described production process, the copolymer can be obtained in a form improved further in melt stability by adding a certain kind of halogen-containing compound to the reaction system and causing it to undergo a reaction in a final stage of the reaction.

As halogen-containing compounds, may be mentioned $C_1$–$C_3$ alkyl halides and halogen-substituted aromatic compounds. It is particularly preferable to use at least one halogen-substituted aromatic compound which contains at least one group having electron-withdrawing property at least equal to —CO— group.

As illustrative examples of such a halogen-substituted aromatic compound, may be mentioned bis(halobenzoyl)benzenes, dihalobenzophenones, dihalodiphenylsulfones, monohalobenzophenones and the like, and mixtures thereof.

It is desirable to conduct the final-stage treatment by adding the above-mentioned halogen-substituted aromatic compound in an amount of 0.1–20 moles, preferably 0.5–10 moles per 100 moles of the charged alkali metal sulfide to the polymerization reaction system in the final stage of the reaction and then allowing it to react at 60°–300° C., more preferably 150°–290° C., most preferably 220°–280° C. for 0.1–20 hours, more preferably 0.1–8 hours.

(6) Conditions for the Granulation

Another principal feature of the process of this invention for the production of the copolymer resides in that the copolymer excellent in melt stability can be obtained as granules by suitably choosing the aforementioned reaction conditions for the copolymer further. Reaction conditions for obtaining at least 50 wt. % of the resulting copolymer as granules collectible by means of a screen having an opening size of 75 $\mu$m (200 mesh) will next be described in further detail.

(i) Weight ratio of the total amount of segment or segments (B) to the total amount of segment or segments (A) in the copolymer:

The weight proportion of segment or segments (B) in the copolymer is an important parameter since each segment (B) contributes to the granulation. When it is desired to obtain the copolymer of this invention as granules, it is necessary to control the ratio of the total amount of segment or segments (B) to the total amount of segment or segments (A) at 0.3–9, preferably 0.5–6, more preferably 1.0–4, all by weight.

If this ratio is lower than 0.3, it becomes difficult to obtain the copolymer as granules. On the contrary, ratios higher than 9 lead to a substantial reduction in the heat resistance of the copolymer. Such low and high ratios are both not preferred.

(ii) Reaction temperature and time for the granulation:

To obtain the copolymer as granules, it is desirable to raise the reaction temperature to a high temperature of at least 240°–290° C., more preferably 250°–290° C. in the course of the reaction or in a final stage of the reaction.

Reaction temperatures lower than 240° C. make it difficult to obtain the copolymer as granules. On the contrary, it is difficult to obtain the copolymer in a form excellent in melt stability if the reaction temperature is higher than 290° C.

The reaction time required for obtaining the copolymer as desired granules becomes shorter as the reaction temperature increases. Conversely, it becomes longer as the reaction temperature decreases. Therefore, it is generally advantageous from the viewpoint of productivity to conduct the reaction at a high temperature of 250° C. or higher. It however becomes difficult to obtain the copolymer in a form excellent in melt stability if the reaction at high temperatures of 250° C. and higher is continued for 7 hours or longer.

C. Collection of Copolymers

To collect the copolymer from the reaction mixture, the following method can be followed. Namely, after completion of the reaction including the treatment in the final stage if applied, the reaction mixture is subjected to flushing and/or distillation, whereby the solvent is removed either partly or wholly to concentrate the reaction mixture. If necessary, the concentrate may be heated to remove any remaining solvent. The resulting solids or concentrate is washed with water and/or an organic solvent to eliminate soluble components such as salts formed in the reaction. The residue is again dried under heat to collect the polymer.

By suitably choosing the reaction conditions in the process of this invention for the production of the copolymer, at least 50 wt. % of the resulting copolymer can be obtained as granules which can be captured on a screen having an opening size of 75 $\mu$m (200 mesh), more preferably 106 $\mu$m (140 mesh), most preferably 150 $\mu$m (100 mesh).

As has been described above, the copolymer can be easily collected as granules by a screen or the like from the reaction mixture after completion of the reaction. The granular polymer thus collected is washed with water and/or an organic solvent and then dried under heat to obtain it in a dry form. Since the copolymer is in a granular form and has excellent handling property, it permits easy separation, water washing, transportation, metering and the like.

ADVANTAGES OF THE INVENTION

The present invention can economically provide crystalline copolymers uniform in composition and excellent in heat resistance, melt stability, processability, handling properties and solvent resistance.

The copolymers having high heat resistance and crystallinity according to this invention can be used in forming or molding various products.

EMBODIMENTS OF THE INVENTION

The present invention will hereinafter be described in further detail by the following examples and comparative examples. It should however be borne in mind that the present invention is not limited only to the following examples.

EXAMPLE 1—PRODUCTION PROCESS NO. 1

Synthesis of PATE Oligomer

A titanium-lined reactor was charged with 3200 g of hydrated sodium sulfide (water content: 53.8 wt. %) and 6000 g of N-methylpyrrolidone (hereinafter abbreviated as "NMP"). While gradually heating the contents to 200° C. in a nitrogen gas atmosphere, 1309 g of water, 1089 g of NMP and 0.39 mole of hydrogen sulfide were distilled out. Thereafter, 104 g of water was added. A liquid mixture consisting of 2320 g of p-dichlorobenzene (hereinafter abbreviated as "PDCB") and 4380 g of NMP was then fed, followed by polymerization at 220° C. for 4 hours and further at 250° C. for 1.3 hours (PDCB/sodium sulfide=0.85 mol/mol; water content/NMP=3.1 mol/kg), whereby about 13.59 kg of a reaction slurry (Slurry $S_1$) containing an oligomer (Oligomer $P_1$) of poly(p-phenylene thioether) was obtained.

A portion of Reaction Slurry $S_1$ was sampled out and then poured into water to have the oligomer precipitated. The oligomer was collected by filtration, thoroughly washed in distilled water and then dried under reduced pressure, thereby obtaining an oligomer sample for molecular weight determination. The weight-average molecular weight of Oligomer $P_1$ was 930.

The amount of PDCB (remaining monomer) in the reaction slurry as determined by gas chromatography was less than 0.1 wt. % of the charged amount.

Synthesis of Copolymer

A titanium-lined reactor was charged with 28.7 g of 1,4-bis(4-chlorobenzoyl)benzene (hereinafter abbreviated as "1,4-BCBB"), 393 g of Reaction Slurry $S_1$ thus obtained, 323 g of NMP and 71 g of water. After the reactor being purged with nitrogen, the contents were heated to 265° C. at which they were polymerized for 1 hour.

The reaction conditions upon synthesis of the copolymer were as follows:

(1) The molar ratio of the total amount of the charged dihalogenated aromatic compound (the sum of the amount of PDCB charged upon synthesis of Oligomer $P_1$ and the amount of 1,4-BCBB charged upon synthesis of the copolymer) to the total amount of the charged alkali metal sulfide (the amount of effective sodium sulfide charged upon synthesis of Oligomer $P_1$) was 1.0.

(2) The molar ratio of the amount of PDCB charged in the first step to the amount of 1,4-BCBB charged in the second step was 5.6.

(3) The ratio of the water content to the organic amide (NMP) was 8.1 mol/kg.

Collection of Copolymer

The resulting reaction mixture in the form of a slurry was passed through a screen having an opening size of 150 $\mu$m (100 mesh) to collect a granular polymer. The resultant polymer was washed three times with acetone and further three times with water, and then dried at 100° C. for 24 hours, thereby obtaining a copolymer (Copolymer $C_1$). The collection rate of Copolymer $C_1$ was 72%.

(Properties of Copolymer $C_1$)

Copolymer $C_1$ was in the form of granules having an average particle size of about 300 $\mu$m. This granular form obviated the electrostatic adhesion of the copolymer to a great extent compared to any powdery polymer.

By an infrared (IR) spectrum analysis, a strong absorption peak attributed to ketone group was observed at about 1660 cm$^{-1}$. Wide angle X-ray diffraction which was conducted using "RAD-B System" manufactured by Rigaku Denki Kabushiki Kaisha showed a diffraction pattern apparently different from that corresponding to PATE homopolymer, PTKK homopolymer or a blend thereof, or a block copolymer of PATE and PTKK.

The content of sulfur in Copolymer $C_1$ was determined by means of a sulfur analyzer ("EMIA-510" manufactured by Horiba Ltd.).

The weight fraction $W_b$ of the recurring units

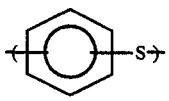

in the copolymer can be calculated in accordance with the following equation:

$$W_b = [(W - W_1)/(W_2 - W_1)] \times 100$$

wherein W means the weight fraction of sulfur in the copolymer, $W_1$ denotes the weight fraction of sulfur in PTKK recurring unit, and $W_2$ represents the weight fraction of sulfur in PATE recurring unit.

By introducing a measured value W=23.0% and calculated values $W_1$=10.1% and $W_2$=29.6% into the above equation, $W_b$ was determined to be 66%.

Physical Properties of Copolymer

The physical properties are collectively given in Table 1.

EXAMPLE 2—PRODUCTION PROCESS NO. 1

Synthesis of PATE Oligomer

A titanium-lined reactor was charged with 1000.6 g of hydrated sodium sulfide (water content: 53.7 wt. %), 6000 g of NMP and 443.2 g of PDCB. The contents were polymerized at 220° C. for 10 hours (PDCB/sodium sulfide=0.508 mol/mol; water content/NMP=4.98 mol/kg), thereby obtaining a reaction slurry (Slurry $S_2$).

Further, a portion of Slurry $S_2$ was treated in the same manner as in Example 1, thereby obtaining an oligomer (Oligomer $P_2$). The amount of PDCB (remaining monomer) in the reaction slurry was less than 0.1 wt. % of the charged amount. The weight-average molecular weight of Oligomer $P_2$ was 600.

Synthesis of Copolymer

A titanium-lined reactor was charged with 682.9 g of the thus-obtained Reaction Slurry $S_2$ and 98.04 g (0.276 mole) of 1,3-bis(4-chlorobenzoyl)benzene (hereinafter abbreviated as "1,3-BCBB"). After the reactor being purged with nitrogen, the contents were heated to 240° C. at which they were reacted for 3 hours.

The reaction conditions upon synthesis of the copolymer were as follows:
(1) The molar ratio of the total amount of the charged dihalogenated aromatic compound (the sum of the amount of PDCB charged upon synthesis of Oligomer $P_2$ and the amount of 1,3-BCBB charged upon synthesis of the copolymer) to the total amount of the charged alkali metal sulfide (the amount of effective sodium sulfide charged upon synthesis of Oligomer $P_2$) was 1.01.
(2) The molar ratio of the amount of PDCB charged in the first step to the amount of 1,3-BCBB charged in the second step was 1.0.
(3) The ratio of the water content to the organic amide (NMP) was about 5 mol/kg.

Collection of Copolymer

The resulting reaction mixture in the form of a slurry was filtered by a filter paper (class: 5A) to collect solids. The thus-collected solids were washed with acetone and water repeatedly and then dried at 100° C., thereby obtaining a copolymer (Copolymer $C_2$). The collection rate of Copolymer $C_2$ was 95%.

Physical Properties of Copolymer

The physical properties of Copolymer $C_2$ are shown in Table 1. Copolymer $C_2$ was soluble in concentrated sulfuric acid, and its reduced viscosity was 0.2 dl/g as measured at 30° C. and a polymer concentration of 0.4 g/dl in concentrated sulfuric acid.

EXAMPLE 3—PRODUCTION PROCESS NO. 2

Synthesis of PATE Oligomer

A reaction slurry (Slurry $S_3$) containing a PATE oligomer (Oligomer $P_3$) was prepared in the same manner as in Example 1 except that the polymerization was conducted by changing the polymerization temperature and time from 250° C. for 1.3 hours to 240° C. for 3 hours.

The weight-average molecular weight of Oligomer $P_3$ was 940, and the amount of the remaining PDCB was less than 0.1 wt. %.

Synthesis of PTKK Oligomer

A titanium-lined reactor was charged with 0,200 mole of 1,4-BCBB, 0,024 mole of hydrated sodium sulfide (water content: 53.8 wt. %), 34 g of water and 400 g of NMP. After the reactor being purged with nitrogen, the contents were maintained at 200° C. for 10 minutes to react them (water content/NMP=about 5 mol/kg), thereby obtaining a reaction slurry ($KS_1$) containing a PTKK oligomer ($K_1$), A portion of the reaction slurry was poured into water, and the water was adjusted to pH 3.0 with hydrochloric acid to have the oligomer precipitated. The oligomer was collected by filtration, thoroughly washed with distilled water and then dried at room temperature under reduced pressure in a vacuum drier, thereby obtaining an oligomer sample. The thus-obtained oligomer sample was dissolved in 98% concentrated sulfuric acid to give a concentration of 1.0 g/dl so as to measure the reduced viscosity of the oligomer at 30° C. The reduced viscosity was as extremely low as 0.05 dl/g.

Synthesis of Copolymer

A titanium-lined reactor was charged with 429 g of Reaction Slurry $S_3$ containing PATE Oligomer $P_3$, 255 g of Reaction Slurry $KS_1$ containing PTKK Oligomer $K_1$ and 37 g of water. After the reactor being purged with nitrogen, the contents were maintained at 265° C. for 1 hour to react them.

The reaction conditions upon synthesis of the copolymer were as follows:
(1) The molar ratio of the total amount of the charged dihalogenated aromatic compound (the sum of the amount of PDCB charged upon synthesis of Oligomer $P_3$ and the amount of 1,4-BCBB charged upon synthesis of PTKK Oligomer $K_1$) to the total amount of the charged alkali metal sulfide (the sum of the amount of effective sodium sulfide charged upon synthesis of Oligomer $P_3$ and the amount of effective sodium sulfide charged upon synthesis of PTKK Oligomer $K_1$) was 1.0.
(2) The molar ratio of the amount of PDCB charged in the first step to the amount of 1,4-BCBB charged in the second step was 5.

(3) The ratio of the water content to the organic amide (NMP) was 8 mol/kg.

Collection of Copolymer

The resulting reaction mixture in the form of a slurry was passed though a screen having an opening size of 150 μm (100 mesh) to collect a granular polymer. The resultant polymer was washed three times with acetone and further three times with water, and then dried at 100° C. for 24 hours, thereby obtaining a copolymer (Copolymer $C_3$) as granules having an average particle size of about 200 μm.

Physical Properties of Copolymer

The physical properties of Copolymer $C_3$ are shown collectively in Table 1.

COMPARATIVE EXAMPLE 1

Synthesis of PTKK Homopolymer

A titanium-lined 1-l reactor was charged with 0.073 mole of 1,4-BCBB, 0,073 mole of hydrated sodium sulfide (water content: 53.9 wt. %), 500 g of NMP and 38.4 g of water. After the reactor being purged with nitrogen, the resultant mixture was maintained at 260° C. for 2 hours to react them (water content/NMP=5.0 mol/kg). The reactor was cooled, and the reaction mixture in the form of a slurry was taken out of the reactor. A portion of the slurry was passed through a screen having an opening size of 75 μm (200 mesh). However, no granular polymer was collected at all.

The remaining slurry was poured into acetone to have the resultant polymer precipitated. The polymer was collected by filtration, and then washed twice with acetone and additionally twice with water. Acetone and water were removed to obtain the polymer in a wet form. The wet polymer was dried at 100° C. to obtain a polymer ($R_1$) as an ivory powder. The average particle size of Polymer $R_1$ thus obtained was about 15 μm. Polymer $R_1$ was soluble in 98% concentrated sulfuric acid but was insoluble in α-chloronaphthalene even when holding for 10 minutes at 220° C. therein.

COMPARATIVE EXAMPLE 2

Experimental Granulation by Co- and Re-dissolution of Homopolymers

A titanium-lined 1-l reactor was charged with 10 g of fine powdery PTKK Polymer $R_1$ obtained in Comparative Example 1 and 15 g of poly(p-phenylene thioether) ("FORTRON #W214", trade mark, product of Kureha Chemical Industry Co., Ltd.) and further with 500 g of NMP and 45 g of water. The contents were maintained at 260° C. for 2 hours. After cooling, the resultant slurry was passed through a screen having an opening size of 75 μm (200 mesh) to collect a granular polymer. From the filtrate, a fine powdery polymer was also collected using a filter paper (class: 5A).

The polymers thus collected were separately washed and dried in a similar manner to Example 1, thereby obtaining 12 g of a granular polymer ($R_2$) and a fine powdery polymer.

Like poly(p-phenylene thioether), Polymer $R_2$ in a granular form was insoluble in 98% concentrated sulfuric acid but soluble at 220° C. in β-chloronaphthalene. Its transition points (melting points, glass transition temperature) were substantially the same as those of poly(p-phenylene thioether). It was unable to obtain any copolymer.

This indicates that when PTKK and PATE are only heated together in a water-containing organic solvent, no reaction takes place between both homopolymers and hence, any copolymer can not be obtained.

COMPARATIVE EXAMPLE 3

Synthesis of Random Copolymer

A titanium-lined 1-l reactor was charged with 0.1212 mole of 1,4-BCBB, 0.3576 mole of hydrated sodium sulfide (water content: 53.9 wt. %), 0.2365 mole of PDCB, 500 g of NMP and 54.2 g of water. The contents were reacted at 260° C. for 2 hours [water content/NMP=5.0 mol/kg, 1,4-BCBB/PDCB=55/45 (weight ratio)].

The reaction mixture in the form of slurry, said mixture containing a random copolymer ($R_3$), had a dark brown color and gave off an odor of decomposed polymers.

As a result of a gas chromatographic analysis, the remaining monomer was founded to be PDCB. Its amount was equal to 22% of the charged amount. The slurry as the reaction mixture was passed through a screen having an opening size of 75 μm (200 mesh). It was however unable to collect any granular polymer. A fine powdery polymer was recovered from the slurry by using a filter paper (class: 5A) and was then washed and dried in a similar manner to Comparative Example 1. The melting point of the resulting Random Copolymer $R_3$ was 157° C. This indicates that 1,4-BCBB and PDCB are substantially different from each other in reactivity and chemical stability in the polymerization system and hence extremely poor in copolymerizability with each other, and moreover, it is only possible to obtain a copolymer whose melting point is much lower than those of poly(p-phenylene thioether) and PTKK homopolymer.

COMPARATIVE EXAMPLE 4

Synthesis of Random Copolymer

Polymerization was conducted in a similar manner to Comparative Example 3 except that 0.081 mole of 1,4-BCBB and 0.356 mole of PDCB were charged in lieu of 0.1212 mole of 1,4-BCBB and 0.2365 mole of PDCB [water content/NMP=5.0 mol/kg, 1,4-BCBB/PDCB=35/65 (weight ratio)].

The reaction mixture in the form of slurry had a dark red color and gave off an offensive odor. The slurry was passed through a screen having an opening size of 75 μm (200 mesh). It was however unable to collect any granular polymer.

As a result of a gas chromatographic analysis, the remaining monomer was founded to be PDCB. Its amount was equal to 14% of the charged amount. As with Comparative Example 3, this indicates that 1,4-BCBB and PDCB are substantially different from each other in reactivity and chemical stability in the polymerization system and hence extremely poor in copolymerizability with each other, so that any satisfactory copolymer can not be obtained therefrom.

COMPARATIVE EXAMPLE 5

Synthesis of PATE Oligomer Having Terminal Halogen Atoms

A reaction slurry ($S_5$) containing a PATE oligomer ($P_5$) was obtained in the same manner as in Synthesis of PATE oligomer of Example 1 except that the molar ratio of the amount of the charged PDCB to the amount of the charged sodium sulfide was changed to 1.10.

Synthesis of PTKK Oligomer

A titanium-lined 1-l reactor was charged with 0.0814 mole of 1,4-BCBB, 0.126 mole of hydrated sodium sulfide (water content: 53.9 wt. %), 17.8 g of water and 325 g of NMP. After the reactor being purged with nitrogen, the resultant mixture was maintained at 220° C. for 1 hour to react them (water content/NMP=5 mol/kg), thereby obtaining a reaction slurry (KS$_5$) containing a PTKK oligomer (K$_5$).

ple 5 and containing PATE Oligomer P$_5$, and 0.0814 mole of 1,4-BCBB, 0.126 mole of hydrated sodium sulfide (water content: 53.9 wt. %), 58.1 g of water and 325 g of NMP. After the reactor being purged with nitrogen, the contents were reacted at 260° C. for 2 hours. The resulting polymer (R$_6$) was collected and dried in a similar manner to Example 2.

Judging from DSC, IR and component analyses, Polymer R$_6$ was substantially identical to poly(p-phenylene thioether).

The physical properties of the resultant polymer are shown collectively in Table 1.

TABLE 1

| | Polymer code | PATE recurring units/PTKK recurring units | | Transition points (°C.) | | Crystallinity melt stability | | | | Melt viscosity 380° C. 1200 sec$^{-1}$ (poise) | Collection rate of polymer (%) Screen opening | | Collect-ability | Remark |
|---|---|---|---|---|---|---|---|---|---|---|---|---|---|---|
| | | Charged value (weight ratio) | Analyzed value (weight ratio) | Tg*$^1$ | Tm*$^1$ | (400° C.) | | (400° C./ 10 min) | | | | | | |
| | | | | | | Tmc (°C.) | ΔHmc (J/g) | Tmc (°C.) | ΔHmc (J/g) | | 150 μm | 75 μm*$^2$ | | |
| Ex. 1 | C$_1$ | 1.9 (66/34) | 1.9 (66/34) | 109 | 311 | 243 | 44 | 240 | 42 | 100 | 72 | 10 | Excellent | Production process No. 1 |
| Ex. 2 | C$_2$ | 0.3 (26/74) | 0.3 (25/75) | 114 | 298 | 211 | 48 | 202 | 18 | 80 | 0 | — | Good | Production*$^4$ process No. 1 |
| Ex. 3 | C$_3$ | 1.7 (63/37) | 1.7 (62/38) | 109 | 313 | 221 | 46 | 208 | 29 | 80 | 72 | 8 | Excellent | Production process No. 2 |
| Comp. Ex. 1 | R$_1$ | 0 (0/100) | PTKK homo-polymer | 148 | 407 | — | — | — | — | — | 0 | 0 | Poor | Fine powder |
| Comp. Ex. 2 | R$_2$ | 1.5 (60/40) | Blend | 86 | 285 | — | — | — | — | — | 48 | — | — | PATE alone collected as granules |
| Comp. Ex. 3 | R$_3$ | 0.7 (40/60) | Trial for random co-polymer | — | 153 | — | — | — | — | — | 0 | 0 | Poor | Offensive odor. Poor copolymer-izability |
| Comp. Ex. 4 | R$_4$ | 1.5 (60/40) | Trial for random co-polymer | — | — | — | — | — | — | — | 0 | 0 | Poor | Offensive odor. Poor copolymer-izability |
| Comp. Ex. 5 | R$_5$ | 2.3 (70/30) | Trial for co-polymer | 86 | 284 | 220 | 41 | 205 | 31 | — | 48 | — | — | PATE alone collected as granules |
| Comp. Ex. 6 | R$_6$ | 2.3 (70/30) | Trial for co-polymer | 86 | 284 | 219 | 43 | 205 | 33 | — | 47 | — | — | PATE alone collected as granules |
| Ref. Ex. | *$^3$ | (100/0) | PATE homo-polymer | 85 | 285 | 238 | 30 | 218 | 25 | 360 | — | — | — | |

Note:
*$^1$: Determined by DSC at a heating rate of 10° C./min by using a quench-pressed sheet (pressed at 330–430° C.) as a sample.
*$^2$: Collection rate of each polymer passing through a sieve having an opening size of 150 μm but recovered on a sieve having an opening size of 75 μm.
*$^3$: "FORTRON #W214", trade mark; poly(p-phenylene thioether) produced by Kureha Chemical Industry Co., Ltd.
*$^4$: 1,3-bis(4-chlorobenzoyl)benzene was used as a monomer.

Experimental Synthesis of Copolymer

A polymer (R$_5$) was synthesized in the same manner as in Example 3 except that the above-prepared slurries containing the respective oligomers were charged in a titanium-lined 1-l reactor in such a way that the ratio of PATE segments to PTKK segments was 70:30 by weight. The resultant polymer was collected and dried.

Judging from DSC, IR and component analyses, Polymer R$_5$ was substantially identical to poly(p-phenylene thioether).

COMPARATIVE EXAMPLE 6

A titanium-lined 1-l reactor was charged with 388 g of Reaction Slurry S$_5$ prepared in Comparative Exam-

EXAMPLE 4

Solubility of polymers in solvent

Copolymer C$_1$, PTKK Homopolymer R$_1$ and poly(p-phenylene thioether) ("FORTRON #W214", trade mark; product of Kureha Chemical Industry Co., Ltd.) were separately hot-pressed and then cooled to form amorphous sheets. The respective amorphous sheets were placed in the solvents shown in Table 2 to investigate their dissolution behavior.

As given in Table 2, the copolymer according to this invention have properties different from PTKK homopolymer and PATE homopolymer which are homopolymers of the components of the copolymer. Namely, the copolymer is insoluble in both 98% concentrated sulfuric acid, which is a solvent for PTKK homopolymer, and e-chloronaphthalene which is a solvent for PATE homopolymer. In addition, the copolymer is clearly different in dissolution behavior in a p-chlorophenol/1,2,4-trichlorobenzene mixed solvent from both PTKK and PATE homopolymers.

Besides, Copolymer $C_1$ was insoluble in alcohols, organic amide solvents, ketone solvents and aromatic solvents at room temperature.

TABLE 2

| Polymer | Solvent | | | | | | |
|---|---|---|---|---|---|---|---|
| | 98% conc. sulfuric acid | α-Chloronaphthalene | | p-Chlorophenol/1,2,4-trichlorobenzene mixed solvent (50/50 weight ratio) | | | |
| | Dissolution temperature | | | | | | |
| | Room*[1] temperature | Room temperature | 220° C. | Room temperature | 215° C. | 215° C.*[2] → room temp. | 215° C.*[3] → 150° C. |
| Copolymer $C_1$ | Δ | X | X | X | O | Precipitated | O |
| PTKK Homopolymer | O | X | X | X | X | — | — |
| PATE Homopolymer | X | X | O | X | O | Precipitated | Precipitated |

X: Insoluble, Δ: Not quite soluble, O: Soluble (to complete clearness to the vision).
*[1]: State when a solubilizing operation was conducted at room temperature for 30 minutes.
*[2]: state when maintained at room temperature for 2 hours after a solubilizing operation was conducted at 215° C. for 30 minutes.
*[3]: State when maintained at 150° C. for 30 minutes after a solubilizing operation was conducted at 215° C. for 30 minutes.

EXAMPLE 5—PRODUCTION PROCESS NO. 1

Synthesis of PATE Oligomer

Reaction Slurry $S_2$ obtained in Example 2 was used.

Synthesis of Copolymer

A titanium-lined reactor was charged with 682.9 g of Reaction Slurry $S_2$ and 98.0 g of 1,4-BCBB. After the reactor being purged with nitrogen, the contents were heated to 245° C. at which they were reacted for 3 hours.

The reaction conditions upon synthesis of a copolymer ($C_5$) were as follows:
 (1) The molar ratio of the total amount of the charged dihalogenated aromatic compound to the total amount of the charged alkali metal sulfide was 1.01.
 (2) The molar ratio of the amount of the charged PDCB to the amount of the charged 1,4-BCBB was 1.0.
 (3) The ratio of the water content to the amount of the charged NMP was 5 mol/kg.

(Collection of copolymer)

Collection was conducted in the same manner as in Example 2, thereby obtaining Copolymer $C_5$. The collection rate was 95%.

Physical Properties of Copolymer C5

Melt viscosity: 140 poises
Melting point: 388° C. (as measured for a quench-pressed sheet)
Melt crystallization temperature: Tmc (400° C.): 334° C. Tmc (400° C./10 min): 285° C.
Melt crystallization enthalpy: ΔHmc (400° C.): 54 J/g
Residual melt crystallization enthalpy: ΔHmc (400° C./10 min): 45 J/g Incidentally, the weight ratio of the sum of PATE recurring units to the sum of PTKK recurring units was 0.3.

Copolymer $C_5$ was soluble in concentrated sulfuric acid, and its reduced viscosity was 0.33 dl/g as measured at 30° C. and a polymer concentration of 0.4 g/dl.

EXAMPLE 6—PRODUCTION PROCESS NO. 1

Synthesis of PATE Oligomer

A reaction slurry (Slurry $S_6$) containing Oligomer $P_6$ of poly(p-phenylene thioether) was obtained in the same manner as in Synthesis of PATE oligomer of Example 1 except that PDCB was charged in such a way that the molar ration of the amount of the charged PDCB to the amount of the charged sodium sulfide was 0.69, and the polymerization was conducted at 220° C. for 4 hours and further at 240° C. for 2 hours.

The weight-average molecular weight of Oligomer $P_6$ was 850 and the amount of PDCB remaining in the reaction slurry was less than 0.1 wt. % of the charged amount.

Synthesis of Copolymer

A titanium-lined reactor was charged with 700 g of Reaction Slurry $S_6$ thus obtained, 108.7 g of 1,4-BCBB, 592 g of NMP and 128.9 g of water. After the reactor being purged with nitrogen, the contents were heated to 265° C. at which they were reacted for 1 hour. The reaction conditions upon synthesis of Copolymer $C_6$ were as follows:
 (1) The molar ratio of the total amount of the charged dihalogenated aromatic compound to the total amount of the charged alkali metal sulfide was 1.00.
 (2) The molar ratio of the amount of the charged PDCB to the amount of the charged 1,4-BCBB was 2.2.
 (3) The ratio of the water content to the amount of the charged NMP was 8 mol/kg.

(Collection of Copolymer)

Collection was conducted in the same manner as in Example 2, thereby obtaining Copolymer $C_6$. The collection rate was 92%.

Physical properties of Copolymer C6

Melt viscosity: 40 poises
Melting point: 364° C. (as measured for a quench-pressed sheet):
Melt crystallization temperature: Tmc (400° C.): 303° C. Tmc (400° C./10 min): 257° C.
Melt crystallization enthalpy: ΔHmc (400° C.): 66 J/g
Residual melt crystallization enthalpy: ΔHmc (400° C./10 min): 35 J/g Incidentally, the weight ratio of the sum of PATE recurring units to the sum of PTKK recurring units was 0.8.

EXAMPLE 7—PRODUCTION PROCESS NO. 1

Synthesis of PATE Oligomer

A reaction slurry (Slurry $S_7$) containing Oligomer $P_7$ of poly(p-phenylene thioether) was obtained in the same manner as in Synthesis of PATE oligomer of Example 1 except that PDCB was charged in such a way that the molar ratio of the amount of the charged PDCB to the amount of the charged sodium sulfide was 0.80, and the polymerization was conducted at 220° C. for 4 hours and further at 240° C. for 2 hours.

The weight-average molecular weight of Oligomer $P_7$ was 940 and the amount of PDCB remaining in the reaction slurry was less than 0.1 wt. % of the charged amount.

(Synthesis of Copolymer)

A charge pot equipped with a heater was mounted on the titanium-lined reactor containing 6300 g of Reaction Slurry $S_7$. The pot was charged with 5211 g of NMP, 617.9 g of 1,4-BCBB and 1135 g of water. After the reactor and charge pot being purged with nitrogen, the respective contents were heated to 180° C. and then mixed with each other.

The resultant mixture was heated to 265° C. at which the contents were reacted for 1 hour. After the contents being allowed to cool down to 240° C., a final treatment of the reaction was conducted. The final stabilizing treatment of the reaction was effected by introducing a liquid mixture of 65.5 g of 4,4'-dichlorobenzophenone (hereinafter abbreviated as "DCBP") and 350 g of NMP under pressure and then reacting the contents at 240° C. for 0.5 hour.

The reaction conditions upon synthesis of Copolymer $C_7$ were as follows:
(1) The molar ratio of the total amount of the charged dihalogenated aromatic compound to the total amount of the charged alkali metal sulfide was 1.00.
(2) The molar ratio of the amount of the charged PDCB to the amount of the charged 1,4-BCBB was 4.0.
(3) The ratio of the water content to the amount of the charged NMP was 8 mol/kg.

Collection of Copolymer

Collection was conducted in the same manner as in Example 1, thereby obtaining Copolymer $C_7$. The collection rate was 65% when collected by means of a screen having an opening size of 150 μm.

Physical properties of Copolymer $C_7$

Melt viscosity: 60 poises
Melting point: 320° C. (as measured for a quench-pressed sheet):
Melt crystallization temperature: Tmc (400° C.): 260° C.
Tmc (400° C./10 min): 225° C.
Melt crystallization enthalpy: ΔHmc (400° C.): 55 J/g
Residual melt crystallization enthalpy: ΔHmc (400° C./10 min): 40 J/g Incidentally, the weight ratio of the sum of PATE recurring units to the sum of PTKK recurring units was 1.4.

EXAMPLE 8—PRODUCTION PROCESS NO. 2

Synthesis of PATE Oligomer

Reaction Slurry $S_6$ obtained in Example 6 was used.

Synthesis of PTKK Oligomer

A titanium-lined reactor was charged with 36.3 g of hydrated sodium sulfide (water content: 53.9 wt. %), 165.6 g of 1,4-BCBB, 700 g of NMP and 43.4 g of water. After the reactor being purged with nitrogen, the contents were heated to 220° C. at which they were polymerized for 1 hour (water content/NMP=5 mol/kg), thereby obtaining a reaction slurry (Slurry $KS_8$) containing an oligomer (Oligomer $K_8$) of PTKK.

The reduced viscosity of the PTKK oligomer was determined in the same manner as in Example 3 and was found to be extremely low and less than 0.05 dl/g.

Synthesis of Copolymer

A titanium-lined reactor was charged with 300 g of Reaction Slurry $S_6$, 472.7 g of Reaction Slurry $KS_8$ and 37.6 g of water. After the reactor being purged with nitrogen, the contents were heated to 265° C. at which they were reacted for 1 hour. After the reaction, the contents were cooled down to 240° C., followed by a final treatment of the reaction. The final stabilizing treatment of the reaction was effected by introducing a liquid mixture of 5.4 g of DCBP and 50 g of NMP under pressure and then reacting the contents at 240° C. for 0.5 hour.

The reaction conditions upon synthesis of Copolymer $C_8$ were as follows:
(1) The molar ratio of the total amount of the charged dihalogenated aromatic compound to the total amount of the charged alkali metal sulfide was 0.99.
(2) The molar ratio of the amount of the charged PDCB to the amount of the charged 1,4-BCBB was 1.3.
(3) The ratio of the water content to the amount of the charged NMP was 8 mol/kg.

Collection of Copolymer

Collection was conducted in the same manner as in Example 2, thereby obtaining Copolymer $C_8$. The collection rate was 92%.

Physical Properties of Copolymer $C_8$

Melt viscosity: 150 poises
Melting point: 382° C. (as measured for a quench-pressed sheet):
Melt crystallization temperature: Tmc (400° C.): 325° C.
Tmc (400° C./10 min): 281° C.
Melt crystallization enthalpy: ΔHmc (400° C.): 51 J/g
Residual melt crystallization enthalpy: ΔHmc (400° C./10 min): 41 J/g Incidentally, the weight ratio of the sum of PATE recurring units to the sum of PTKK recurring units was 0.4.

EXAMPLE 9—PRODUCTION PROCESS NO. 2

Synthesis of PATE Oligomer

A titanium-lined reactor was charged with 2050 g of hydrated sodium sulfide (water content: 39.1 wt. %), 1952 g of PDCB, 8000 g of NMP and 48 g of sodium hydroxide. After the reactor being purged with nitrogen, the contents were heated to react them at 230° C. for 4 hours and further at 240° C. for 2 hours (PDCB/sodium sulfide=0.83 mol/mol; water content/NMP=5.6 mol/kg), thereby obtaining a reaction slurry (Slurry $S_9$) containing Oligomer $P_9$.

The weight-average molecular weight of Oligomer $P_9$ was 950 and the amount of PDCB remaining in the reaction slurry was less than 0.1 wt. % of the charged amount.

(Synthesis of PTKK Oligomer)

A titanium-lined reactor was charged with 76.9 g of hydrated sodium sulfide (water content: 53.9 wt. %), 690 g of 1,4-BCBB and 7000 g of NMP. After the reactor being purged with nitrogen, the contents were heated to 220° C. at which they were polymerized for 1 hour (water content/NMP=5.6 mol/kg), thereby obtaining a reaction slurry (Slurry $KS_9$) containing Oligomer $K_9$ of PTKK.

The reduced viscosity of the PTKK oligomer was determined in the same manner as in Example 3 and was found to be extremely low and less than 0.05 dl/g.

Synthesis of Copolymer

A titanium-lined reactor was charged with 360 g of Reaction Slurry $S_9$ and 426 g of Reaction Slurry $KS_9$. After the reactor being purged with nitrogen, the contents were heated to 265° C. at which they were reacted for 1 hour. After the reaction, the contents were cooled down to 240° C., followed by a final treatment of the reaction. The final stabilizing treatment of the reaction was effected by introducing a liquid mixture of 5.3 g of DCBP and 50 g of NMP under pressure and then reacting the contents at 240° C. for 0.5 hour.

The reaction conditions upon synthesis of Copolymer $C_9$ were as follows:
(1) The molar ratio of the total amount of the charged dihalogenated aromatic compound to the total amount of the charged alkali metal sulfide was 0.99.
(2) The molar ratio of the amount of the charged PDCB to the amount of the charged 1,4-BCBB was 4.0.
(3) The ratio of the water content to the amount of the charged NMP was 5.6 mol/kg.

Collection of Copolymer

Collection was conducted in the same manner as in Example 1, thereby obtaining Copolymer $C_9$. The collection rate was 58% when collected by means of a screen having an opening size of 150 μm.

Physical Properties of Copolymer $C_9$

Melt viscosity: 40 poises
Melting point: 319° C. (as measured for a quench-pressed sheet):
Melt crystallization temperature: Tmc (400° C.): 318° C.
Tmc (400° C./10 min): 220° C.
Melt crystallization enthalpy: ΔHmc (400° C.): 47 J/g
Residual melt crystallization enthalpy: ΔHmc (400° C./10 min): 37 J/g
Incidentally, the weight ratio of the sum of PATE recurring units to the sum of PTKK recurring units was 1.4.

EXAMPLE 10—PRODUCTION PROCESS NO. 2

Synthesis of PATE Oligomer

Reaction Slurry $S_6$ obtained in Example 6 was used.

Synthesis of PTKK Oligomer

A titanium-lined reactor was charged with 98.4 g of hydrated sodium sulfide (water content: 53.9 wt. %), 355.2 g of 1,3-BCBB, 3000 g of NMP and 217 g of water. After the reactor being purged with nitrogen, the contents were heated to 220° C. at which they were polymerized for 1 hour (water content/NMP=5 mol/kg), thereby obtaining a reaction slurry (Slurry $KS_{10}$) containing Oligomer $K_{10}$ of PTKK.

The reduced viscosity of the PTKK oligomer was determined in the same manner as in Example 3 and was found to be extremely low and less than 0.05 dl/g.

Synthesis of Copolymer

A titanium-lined reactor was charged with 140 g of Reaction Slurry $S_6$, 513.2 g of Reaction Slurry $KS_{10}$ and 31.4 g of water. After the reactor being purged with nitrogen, the contents were heated to 240° C. at which they were reacted for 3 hours. Further, a final treatment of the reaction was conducted at 240° C. The final stabilizing treatment of the reaction was effected by introducing a liquid mixture of 2.8 g of DCBP and 50 g of NMP under pressure and then reacting the contents for 0.5 hour.

The reaction conditions upon synthesis of Copolymer $C_{10}$ were as follows:
(1) The molar ratio of the total amount of the charged dihalogenated aromatic compound to the total amount of the charged alkali metal sulfide was 0.99.
(2) The molar ratio of the amount of the charged PDCB to the amount of the charged 1,3-BCBB was 1.0.
(3) The ratio of the water content to the amount of the charged NMP was 8.0 mol/kg.

Collection of Copolymer

Collection was conducted in the same manner as in Example 2, thereby obtaining Copolymer $C_{10}$. The collection rate was 93%.

Physical Properties of Copolymer $C_{10}$

Melt viscosity: 60 poises
Melting point: 296° C. (as measured for a quench-pressed sheet):
Melt crystallization temperature: Tmc (400° C.): 213° C.
Tmc (400° C./10 min): 205° C.
Melt crystallization enthalpy: ΔHmc (400° C.): 50 J/g
Residual melt crystallization enthalpy: ΔHmc (400° C./10 min): 21 J/g
Incidentally, the weight ratio of the sum of PATE recurring units to the sum of PTKK recurring units was 0.3.

We claim:

1. A process for the production of a poly(arylene thioether-ketone-ketone) copolymer comprising (A) at least one poly(arylene thioether-ketone-ketone) segment and (B) at least one poly(arylene thioether) segment, which comprises at least the following three steps:
   i) heating in the presence of water an organic amide solvent containing a dihalogenated aromatic compound, which consists principally of a dihalobenzene, and an alkali metal sulfide, whereby a poly(arylene thioether) oligomer having at least 50 wt. % recurring units of the formula

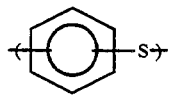

and at least one terminal thiolate group is synthesized, ii) heating in the presence of water an organic amide solvent containing a dihalogenated aromatic compound, which consists principally of at least one bis(halobenzoyl)benzene, and an alkali metal sulfide, whereby a poly(arylene thioether-ketone-ketone) oligomer having at least 50 wt. % recurring units of the formula

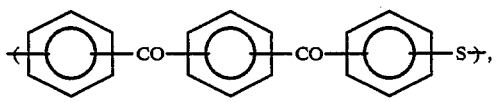

and terminal halogen atoms is synthesized, and iii) mixing and reacting the poly(arylene thioether) oligomer, which has been obtained in the step i), with poly(arylene thioether-ketone-ketone) oligomer obtained in the step ii) and optionally, water;

said first through third steps i)–iii) being conducted under the following conditions (a)–(g):

(a) in the first step i), the ratio of the water content to the amount of the charged organic amide solvent being 0.1–15 (mol/kg), the ratio of the amount of the charged dihalogenated aromatic compound to the amount of the charged alkali metal sulfide being 0.3–0.9 (mol/mol), and the polymerization being conducted in such a manner that the weight-average molecular weight of the resulting poly(arylene thioether) oligomer having at least one terminal thiolate group becomes at least 200 but lower than 1000, (b) in the second step ii), the ratio of the water content to the amount of the charged organic amide solvent being controlled within a range of 0.1–15 (mol/kg) and the reaction being conducted within a temperature range of 60°–300° C. with the proviso that the reaction time at 210° C. and higher is not longer than 10 hours, (c) in the third step iii), the ratio of the water content to the amount of the charged organic amide solvent being 0.1–15 (mol/kg), (d) in the third step iii), the ratio of the total amount of the charged dihalogenated aromatic compound, said total amount being the amount of the whole dihalogenated aromatic compounds including the dihalobenzene and the bis(halobenzoyl)benzene, to the total amount of the charged alkali metal sulfide, said latter total amount being the total amount of the alkali metal sulfide charged in the first step i) and that charged in the second step ii), being controlled within a range of 0.95–1.2 (mol/mol), (e) the ratio of the charged amount of the dihalogenated aromatic compound consisting principally of the dihalobenzene in the step i) to the charged amount of the dihalogenated aromatic compound consisting principally of the bis(halobenzoyl)benzene in the step ii) being controlled within a range of 0.25–26 (mol/mol), (f) the reaction of the third step iii) being conducted within a temperature range of 150°–300° C. with the proviso that the reaction time at 210° C. and higher is not longer than 10 hours, and (g) in the third step iii), the reaction being conducted until the melt viscosity of the resulting copolymer becomes 2–100,000 poises as measured at 380° C. and a shear rate of 1,200/sec.

2. The process as claimed in claim 1, wherein the segment (A) has at least 50 wt. % recurring units of the formula

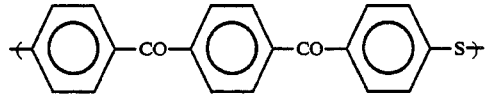

and the segment (B) has at least 50 wt. % recurring units of the formula

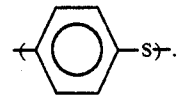

3. The process as claimed in claim 1, wherein the segment (A) has at least 50 wt. % recurring units of the formula

and the segment (B) has at least 50 wt. % recurring units of the formula

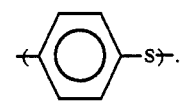

4. The process as claimed in claim 1, wherein in each of the steps i) through iii), the reaction is conducted in a reactor at least a portion of which, said portion being brought into contact with the reaction mixture, is made of a corrosion-resistant material.

5. The process as claimed in claim 4, wherein the corrosion-resistant material is a titanium material.

6. The process as claimed in claim 1, wherein the organic amide solvent is at least one pyrrolidone selected from N-methylpyrrolidone and N-ethylpyrrolidone.

7. The process as claimed in claim 1, wherein at least 50 wt. % of the resulting copolymer is in the form of granules recoverable on a sieve having an opening size of 75 μm.

* * * * *